Oct. 29, 1929.                H. FRISCHER                1,733,152
                      METHOD OF PRODUCING PURE ACIDS
                            Filed May 16, 1927
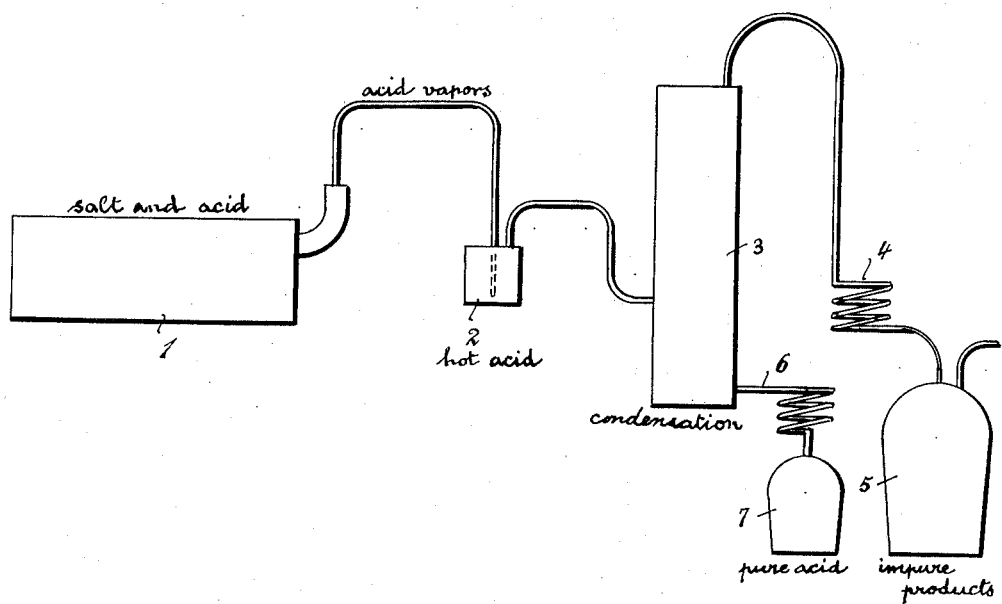

UNITED STATES PATENT OFFICE

HERMANN FRISCHER, OF COLOGNE-LINDENTHAL, GERMANY

METHOD OF PRODUCING PURE ACIDS

Application filed May 16, 1927, Serial No. 191,918, and in Germany December 4, 1926.

My invention refers to the production of volatile acids and more especially to the production of acids such as acetic acid, formic acid, hydrofluoric acid, and nitric acid in pure state. It is an object of my invention to provide means whereby this production can be carried out in a more efficient manner and with a greater yield of the acids to be produced than was hitherto possible.

Hitherto volatile acids such as acetic acid, hydroflouric acid, formic acid, and nitric acid, in order to be obtained in a pure state, after having been recovered from their salts by reaction with sulfuric acid or phosphorous acid, had to be subjected to a subsequent purification by redistillation. When acting for instance with sulfuric acid on salts such as calcium acetate, sodium formate, calcium fluoride, or sodium nitrate, it is inevitable that other salts, which are admixed to these salts as impurities, are also decomposed and are carried along with the distillate. Thus the chlorides always present in the salts treated with sulfuric acid are also converted into sulfates and hydrochloric acid, and occur again in the distillate as impurities. It is further inevitable that solid matter and sulfuric acid are admixed with the acids produced, either by atomization or by splashing. Hitherto all these impurities had to be removed by repeated distillation of the acid products in separate apparatus.

According to the present invention volatile acids such as acetic acid, formic acid, hydrofluoric acid, or nitric acid are recovered in a pure state and in a single operation, without any redistillation being required, by forcing the vapors distilling over either by suction or pressure through hot acids, when producing acetic acid through hot acetic acid, when producing formic acid through hot formic acid, and so on. I have further ascertained that the acid vapors distilling over can be freed from other volatile acids, such as hydrochloric acid, or sulfuric acid, by adding to the hot acid, through which the vapors are forced, some of a salt of the acid to be recovered, for instance some sodium acetate in the case of acetic acid, some sodium formate in the case of formic acid, and so on. The presence of these salts in the respective acids leads to the combination of hydrochloric acid or sulfuric acid under formation of chlorides and sulfates, acetic acid, formic acid, and the like being set free at the same time. This mode of purifying the acid vapors is of particular importance when operating continuously, for in this case always uniform quantities of acid vapors of uniform concentration are recovered in the washers and purifying apparatus.

Obviously besides the salts of the respective acids and in accordance with the character of the impurities present in the starting products, other purifying agents can also be added to the hot washing acids, for instance in the case of acetic acid potassium permanganate or potassium dichromate, for the removal of sulfur dioxide.

When operating in this manner it has been shown that the hot acids will eagerly take up all the impurities above mentioned from the hot vapors, and that the condensate obtained from the purified acid vapors is always approximately, and in most cases even chemically pure.

In order to always maintain as uniform quantities as possible of hot washing acids in the apparatus and to prevent an increase thereof by condensation of the acid vapors distilling over, these vapors are preferably subjected to heating up, in order to thus obviate the loss of temperature by radiation which might lead to condensation, without taking recourse to further sources of heat. The degree of heating up depends upon the season and the temperature of the outer air, as well as upon the degree of insulation. As a rule, with a normal insulation of the apparatus and normal temperature of the outer air by 15° C., a heating up of about 15 to 20° C. has been found sufficient. In all smaller apparatus, which have a larger radiating surface in proportion to the production, heating up to 25 to 35° C. is to be recommended. The degree of heating in each individual case will best be found out during operation by observing the operation, it being important that the quantity of washing acids be kept constant.

The purification above described is of particular importance when producing concentrated acids in continuous operation. By inserting a rectification column and dephlegmator, the purified acetic acid vapors can be converted into concentrated acetic acid, the vapors of formic acid into concentrated formic acid, the vapors of nitric acid into concentrated nitric acid, in one and the same operation.

In the drawings the invention is illustrated in a diagrammatic manner.

As shown in the drawings, 1 is the still, which has the form of a horizontally extending cylinder, 2 is the washer, 3 is the condensation column, 4 is a cooler for the vapors escaping from the column, 5 is the collecting vessel for the condensates, 6 is the cooling coil for the acid flowing from the column, and 7 is the collecting vessel for this acid.

In the still 1 sulfuric acid or phosphorous acid is caused to act on a salt of the acid to be produced, and the acid vapors are conducted into the washer 2 containing hot acid of the kind which shall be produced, to which is admixed some salt of the kind which is acted upon by the sulfuric or phosphorous acid and, if desired, other purifying agents, such as for instance potassium permanganate. Between the still 1 and washer 2 can be inserted means for heating up the vapors so as to prevent their condensation in the washer. The purified vapors escaping from the washer are rectified in the column 3 and, if desired, concentrated by dephlegmation, the pure acid being collected in the vessel 7.

The process can be carried out under pressure as well as in vacuo and at ordinary pressure.

Various changes may be made in the details disclosed in the foregoing specification without departing from the invention or sacrificing the advantages thereof.

I claim:—

1. The method of producing pure acids comprising causing the acid vapors to pass through hot acid of the kind to be produced while preventing any substantial condensation of said vapors in said acid.

2. The method of producing pure acids comprising forcing the acid vapors to pass through hot acid of the kind to be produced while preventing any substantial condensation of said vapors in said acid.

3. The method of producing pure acids comprising causing the acid vapors to pass through a mixture of hot acid of the kind to be produced with a salt of the same acid while preventing any substantial condensation of said vapors in said acid.

4. The method of producing pure acids comprising causing the acid vapors to pass through a mixture of hot acid of the kind to be produced with a salt of the same acid and an oxidizing agent while preventing any substantial condensation of said vapors in said acid.

5. The method of producing pure acids comprising developing vapors of such acid, raising the temperature of such vapors to prevent condensation, and leading said vapors through a body of hot acid of the kind to be produced.

6. The method of producing pure acids comprising developing vapors of such acid, raising the temperature of such vapors to prevent condensation, and leading said vapors through a body of hot acid of the kind to be produced, which contains a salt of said acid.

7. The method of producing pure acids comprising acting on a salt of said acid with another acid to cause decomposition of said salt and leading the acid vapors developed through a body of hot acid of the kind to be produced while preventing any substantial condensation of said vapors in said acid.

8. The method of producing pure acids comprising acting on a salt of said acid with another acid to cause decomposition of said salt and leading the acid vapors developed through a body of hot acid of the kind to be produced, which contains some salt of the kind from which said vapors were developed while preventing any substantial condensation of said vapors in said acid.

9. The method of producing pure acids comprising acting on a salt of said acid with another acid to cause decomposition of said salt, raising the temperature of such vapors to avoid condensation and leading said acid vapors through a body of hot acid of the kind to be produced.

10. The method of producing pure acids comprising acting on a salt of said acid with another acid to cause decomposition of said salt, leading the acid vapors developed through a body of hot acid of the kind to be produced while preventing any substantial condensation of said vapors in said acid and condensing said vapors and concentrating the acid thus obtained.

In testimony whereof I affix my signature.

HERMANN FRISCHER.